United States Patent
Dejneka et al.

(10) Patent No.: US 6,694,080 B2
(45) Date of Patent: Feb. 17, 2004

(54) APPARATUS AND METHOD FOR THERMALLY TUNING AN OPTICAL AMPLIFIER

(75) Inventors: Matthew J. Dejneka, Corning, NY (US); Bryce N. Samson, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 198 days.

(21) Appl. No.: 09/961,115

(22) Filed: Sep. 20, 2001

(65) Prior Publication Data
US 2003/0053776 A1 Mar. 20, 2003

(51) Int. Cl.[7] .............................. G02B 6/16; H01S 3/063
(52) U.S. Cl. ..................... 385/123; 385/142; 385/144; 359/341.1
(58) Field of Search ..................... 385/142, 123–127, 385/141, 144; 359/341.1, 341.5

(56) References Cited

U.S. PATENT DOCUMENTS

| | | | | |
|---|---|---|---|---|
| 4,938,561 A | * | 7/1990 | Grasso et al. ............ 359/341.1 |
| 4,947,648 A | | 8/1990 | Harwell et al. ............... 62/3.2 |
| 5,345,332 A | * | 9/1994 | daSilva et al. ............ 359/337.1 |
| 5,406,410 A | | 4/1995 | Hanna et al. ............... 359/341 |
| 5,447,032 A | * | 9/1995 | Epstein et al. ............... 62/3.1 |
| 6,041,610 A | | 3/2000 | Edwards et al. ............. 62/264 |
| 6,104,526 A | * | 8/2000 | Kakui ....................... 359/337 |
| 6,147,795 A | * | 11/2000 | Derbyshire et al. ......... 359/337 |
| 6,212,310 B1 | * | 4/2001 | Waarts et al. ................. 385/24 |
| 6,246,511 B1 | | 6/2001 | Jameson .................... 359/337 |
| 6,320,693 B1 | | 11/2001 | Cereo et al. ............... 359/337 |
| 6,452,717 B1 | * | 9/2002 | Endo .......................... 359/337 |
| 6,532,102 B2 | * | 3/2003 | Kobayashi et al. ......... 359/334 |
| 6,535,329 B1 | * | 3/2003 | Pelard et al. ............... 359/337 |

FOREIGN PATENT DOCUMENTS

JP 02-300727 12/1990 ............. G02F/1/35

OTHER PUBLICATIONS

"Erbium–doped fibre amplifiers: the latest revolution in optical communications" D.A. Chapman, Electronics & Communication Engineering Journal, Apr. 1994, pp. 59–67.
"Atomic, Molecular, & Optical Physics Handbook", Gordon W. F. Drake, American Institute of Physics, 1996, p. 607–608.

* cited by examiner

Primary Examiner—John D. Lee
Assistant Examiner—Sarah U Song
(74) Attorney, Agent, or Firm—Kenta Suzve; Wilson Sonsini Goodrich & Rosati

(57) ABSTRACT

An apparatus and method for thermally tuning an optical amplifier comprises an optical waveguide doped with a fluorescent material, a thermal device for either heating or cooling the optical waveguide, and a pump light for exciting the fluorescent material. The apparatus shapes, shifts, and/or flattens the gain curves of the doped optical amplifier. Thulium doped fiber is cooled to shift the gain curve into the C-band. Erbium doped fiber is heated to flatten the gain curve in the C-band and is cooled to shift the gain curve above the L-band. The apparatus similarly shapes the gain curves of other fluorescent materials. The thermal device comprises three types of optical cooling devices. The apparatus is a component in communications systems, lasers, medical lasers and the like. The method comprises either heating or cooling optical waveguides doped with fluorescent materials to achieve the desired shaping, shifting, and flattening of the gain curves.

50 Claims, 9 Drawing Sheets

Might be better if fiber coil is in or on Heater or cooler. A TEC can do both

APPARATUS AND METHOD FOR THERMALLY TUNING AN OPTICAL AMPLIFIER

BACKGROUND OF THE INVENTION

1. Field of the Invention

The present invention relates to optical systems and, in particular, to apparatus and methods for tuning optical amplifiers and for cooling optical waveguides.

2. Technical Background

There is considerable interest in the field of optics, particularly relating to the area of telecommunication systems. Optical fibers are the transmission medium of choice for handling the large volume of voice, video, and data signals that are communicated over both long distances and local networks. Much of the interest in this area has been spurred by the significant increase in communications traffic, which is due, at least in part, to the Internet. Consequently, much interest is directed to increasing the data handling capacities of the optical fibers that comprise the communications networks. It is also of interest to increase the capacities of currently installed optical fibers and thereby eliminate the need for installing additional optical fiber cables. One way of increasing the capacity of optical fibers is to increase the number of channels or signals that are transmitted through each optical fiber. However, there are several technical difficulties with increasing the number of channels.

One limitation is that only certain wavelengths of optical signals can be efficiently transmitted through an optical fiber. For a typical optical fiber, the most efficient wavelengths (i.e. those with low loss per unit length) are in the S-band, C-band and L-band which comprise wavelengths from approximately 1460 nm through 1630 nm. Signals having wavelengths outside of this range suffer increased signal loss and are therefore cannot be transmitted efficiently along optical fibers.

Another limitation is related to amplifying the signals in the S, C, and L-bands when the signals are transmitted for long distances. Although modern optical fibers have very low loss per unit length, they nonetheless require periodic amplification of the transmitted signal to ensure accurate reception at a receiver. Initially, electronic amplifiers were used to amplify these optical signals. Electronic amplifiers converted the optical or light signals into electrical signals, amplified the electrical signals, and then retransmitted the signals as light signals. This was an expensive and inefficient way to amplify optical signals.

More recently, erbium doped optical amplifiers have revolutionized optical telecommunications by providing all optical high-gain, low-noise amplification over many channels without the need for the costly electronic repeaters. Optical amplifiers comprise a length of optical waveguide or fiber that is doped with a suitable fluorescent material such as erbium ions or thulium ions. A pump light source is injected into the doped fiber to excite the fluorescent ions. When a light signal is transmitted through the doped fiber, the excited ions release their energy at the same wavelength as the signal and thereby produce a highly amplified signal.

Unfortunately, erbium doped fiber amplifiers are primarily useful only in the C-band and, to a lesser extent, in the L-band. As bandwidth demand increases, the need to amplify signals outside of the conventional erbium doped fiber amplifier (EDFA) range increases. In the quest to expand the bandwidth of optical amplifiers, the prior art has attempted to develop exotic doping materials to create an improved optical amplifier. The prior art has also experimented with various complex light pumping schemes to improve the performance of optical amplifiers.

Yet another challenge confronting the industry are the increasingly tough specifications for amplifiers. Gain shaping, gain flattening, and gain tilt compensation are becoming more and more important as ripple and bandwidth specifications get tougher and wider.

The continuing challenge is to find an apparatus and method to increase the bandwidth of optical amplifiers and shape and flatten the gain of amplifiers so that the transmission capacity of optical fibers can be increased.

SUMMARY OF THE INVENTION

To address the problems discussed above, the invention discloses an apparatus and method for thermally tuning an optical amplifier which comprises: an optical wave guide doped with a fluorescent material, a thermal device for either heating or cooling the optical wave guide, and a pump light source for exciting the fluorescent material.

It has been discovered that by changing or controlling the temperature of a doped optical amplifier, the gain curve of the fiber can be shifted or shaped over various wavelengths. Accordingly, the invention uses this discovery to shape, shift, and/or flatten the gain curves of doped optical amplifiers to achieve the desired results. For example, thulium doped optical fiber is cooled to shift the gain curve into longer, more useful wavelengths. Similarly, erbium doped optical fiber is cooled to shift the gain curve to longer wavelengths above the L-band. As yet another example, an erbium doped optical fiber is heated to flatten the gain curve in the C-band. The invention may also be used to shape the gain curves of other fluorescent materials used in optical amplifiers.

In order to achieve the cooling of the optical amplifiers, three optical cooling devices are disclosed. The first optical cooling device comprises an optical fiber (cooling fiber) doped with an appropriate fluorescent refrigerant material and coupled with a pump light source. The cooling fiber is co-wound with an amplifying fiber and the cooling fiber is cooled as the pump light is activated. The amplifying fiber is cooled by the cooling fiber due to their close proximity.

A second embodiment comprises doping the cladding of the optical amplifier fiber with a fluorescent refrigerant such as ytterbium. A pump light source is coupled with the cladding to cause the cladding to cool and thereby cause the core of the fiber amplifier to cool. An additional advantage of using this embodiment is that some fluorescent refrigerants, such as ytterbium, produce pump light as a by-product. This pump light may then be used to pump the fluorescent material in the core.

A third embodiment comprises an optical fiber amplifier having two cores. A first core is doped with a fluorescent material suitable for amplifying an optical signal. The second core is doped with a fluorescent refrigerant material. When pump the is applied to the second core, the core cools and also causes the nearby first core to cool.

The apparatus is useful in not only in telecommunication systems, but also in laser printers, laser marking, medical imaging, microsurgery, scientific research and development, and the like. It follows that the method of the invention comprises either heating or cooling an optical waveguide doped with fluorescent material to achieve desired shaping, shifting, and flattening of the gain curves.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

DETAILED DESCRIPTION OF THE PREFERRED EMBODIMENT

The invention entails controlling the temperature of the optically active gain medium (e.g. the fluorescent material) in an optical amplifier to increase the performance and utility of the device. A brief description of the scientific discoveries that led to the invention is first presented.

Figure 1:
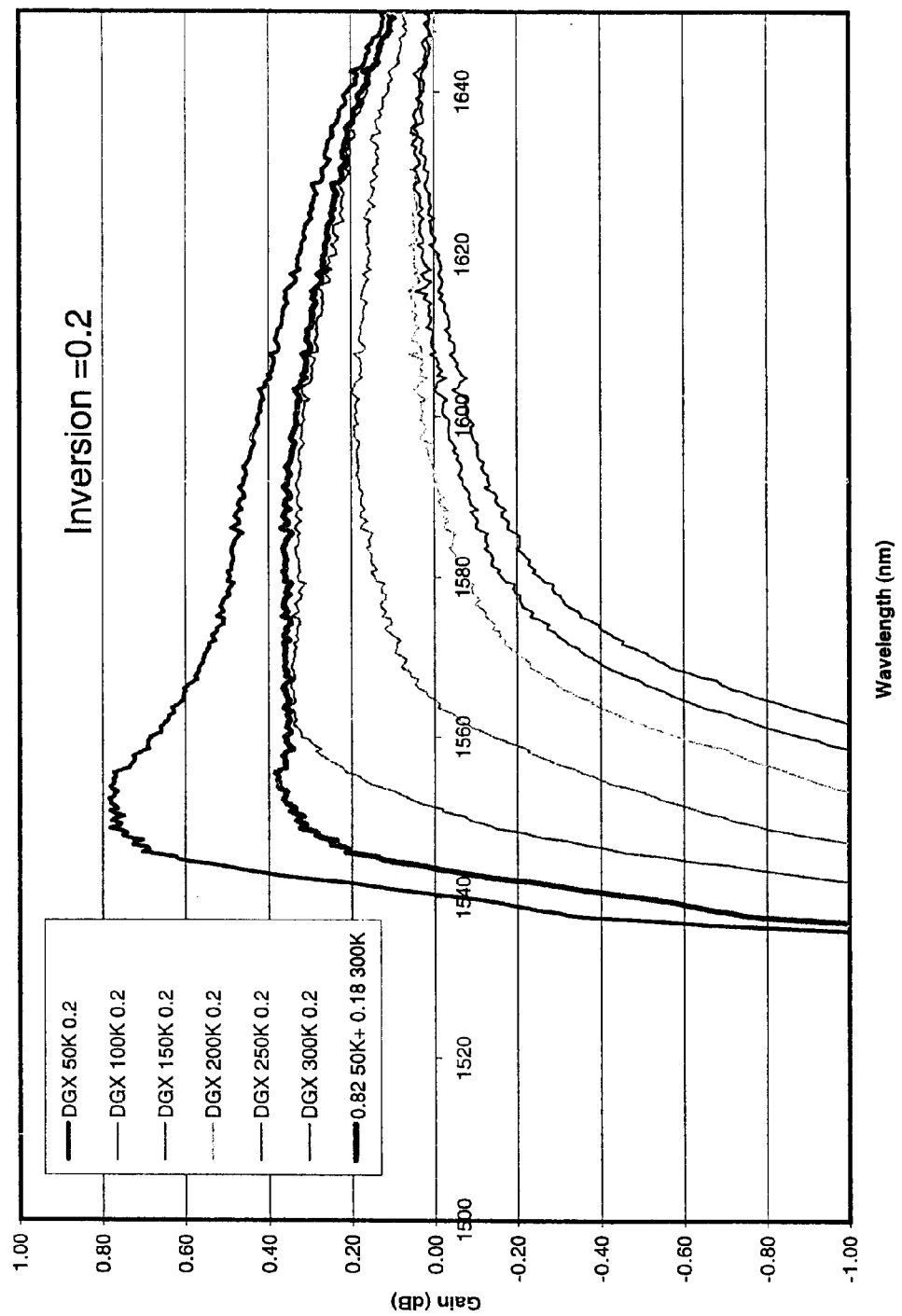
FIG. 1 illustrates a fluorescence curve for thulium which is representative of the gain curve of thulium.

FIG. 1 illustrates the fluorescence spectrum of the thulium $Tm^{3+}$ as a function of temperature in 50 degree Kelvin increments. Since the $Tm^{3+}$ emission is a four level transition, the fluorescence curve is indicative of the gain curve of a thulium-doped amplifier. At normal room temperature, much of the gain curve is in the undesirable spectrum below 1500 nm. However, as the temperature is decreased, the fluorescence intensity on the red side (i.e. longer wavelengths) of the spectrum, in the desirable 1500 nm region, increases at the expense of the useless fluorescence at 1400 nm. The gain shape also changes considerably with temperature and this is used to decrease gain ripple. This can be seen as the relatively flat portion of the gain curve between about 1460 nm and 1510 nm. Since this temperature dependent characteristic is observed in thulium and erbium it is also predicted that similar advantageous gain curve changes will be present in other fluorescent materials and particularly other rare earth elements.

Figure 2:
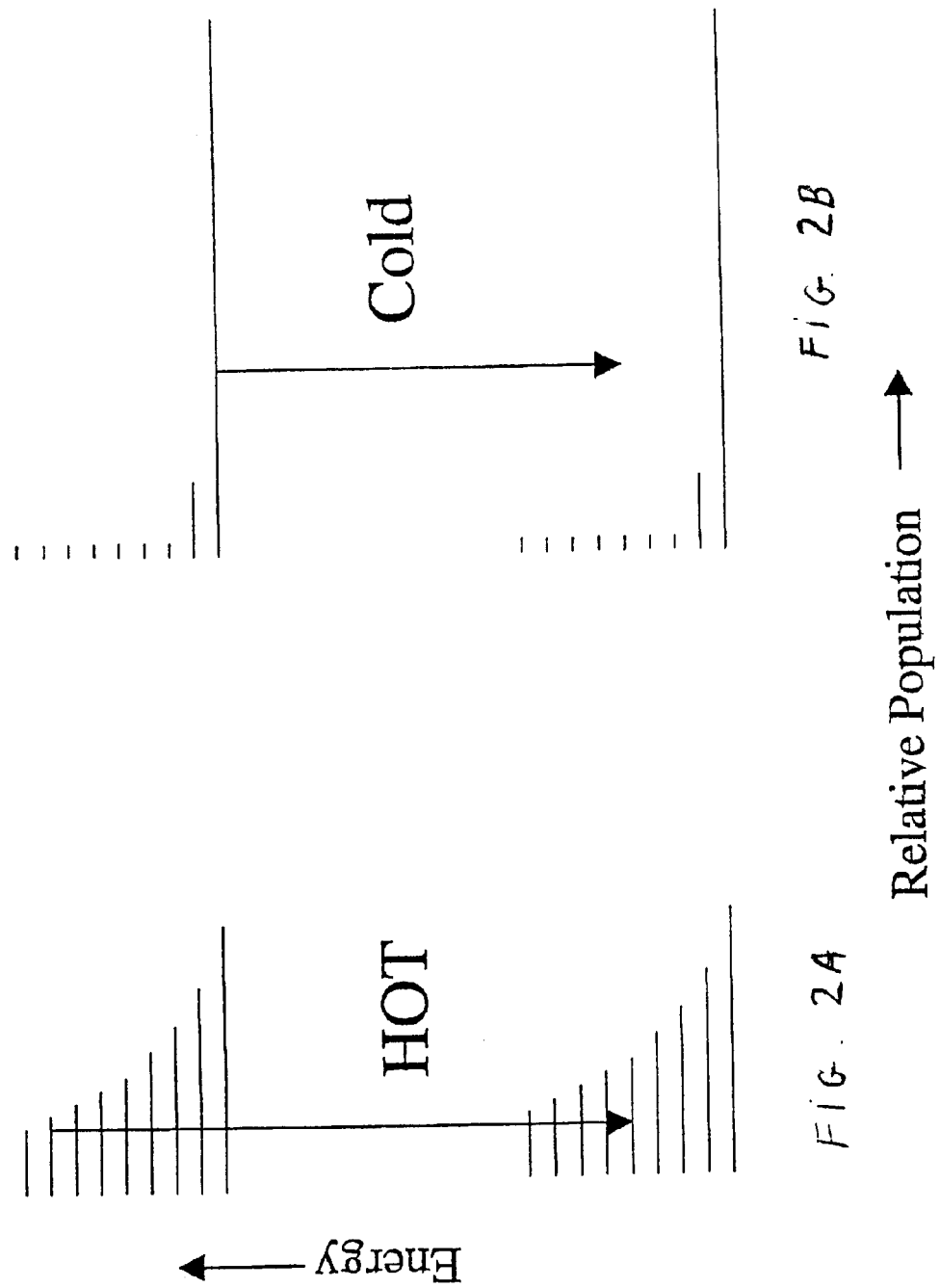
FIGS. 2a and b illustrates various Stark energy level transitions when thulium at different temperatures.

Rare earth energy levels are split into 2J+1 Stark sublevels, so the $Tm^{3+} \, ^3H_4 \rightarrow \, ^3F_4$ transition at 1460 nm has 9 sublevels in the initial state and 9 sublevels in the terminal state. Thus the 1460 nm transition is actually made up of 81 individual transitions and is why this emission is so broad and non-gaussian. The population distribution among the nine sublevels is dependent on temperature and is proportional to $e^{-\Delta E/kT}$ where $\Delta E$ is the energy difference between the lowest Stark level and the level of interest, k is Boltzmann's constant, and T is absolute temperature. FIGS. 2A and 2B show the relative populations of the sublevels and the transitions between the Stark levels. FIG. 2A illustrates the 81 possible transitions at room temperature. Conversely, FIG. 2B illustrates the four transitions possible at cold 10 degrees Kelvin. The seven small dashes are representative of the Stark levels, but each of these levels are essentially empty at low temperatures.

Figure 3:
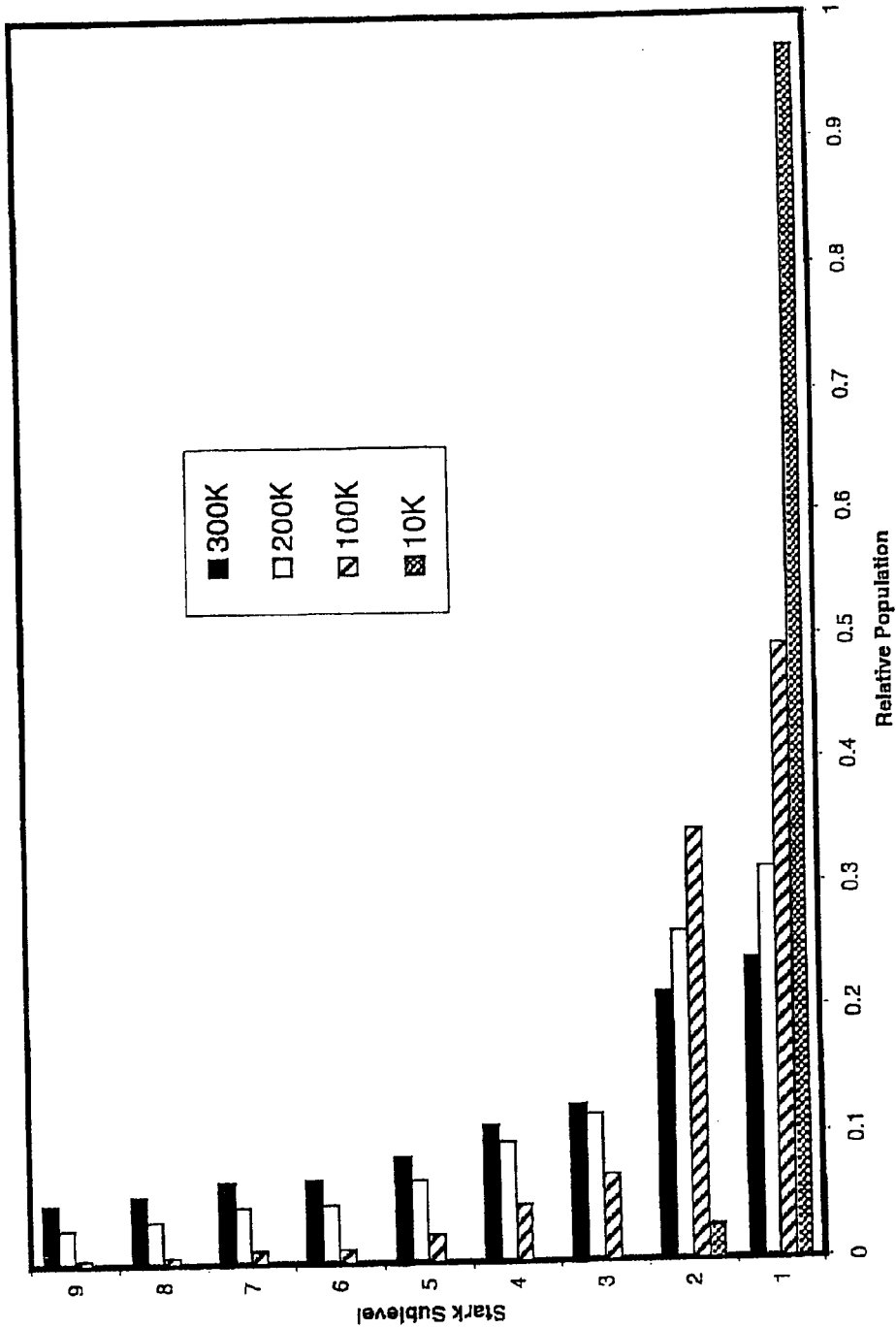
FIG. 3 illustrates the population distribution among the nine Stark sublevels at various temperatures.

Referring to FIG. 3 there is illustrated the relative population distribution of the thulium $^3H_4$ Stark levels at various temperatures. At low temperatures (e.g., 10 degrees Kelvin) the population is entirely confined to the two lowest lying Stark components and as the temperature increases there is enough thermal energy to distribute the population to the higher lying Stark components. Thus as the temperature is decreased, the population among the initial level shifts to the lowest lying states resulting in a red shifting of the fluorescence since the ions are starting in a lower energy state. Likewise, the absorption bands will blue shift to higher energies as the temperature is decreased since the ions are starting from lower Stark levels making the absorption energy gap effectively larger.

Figure 4:
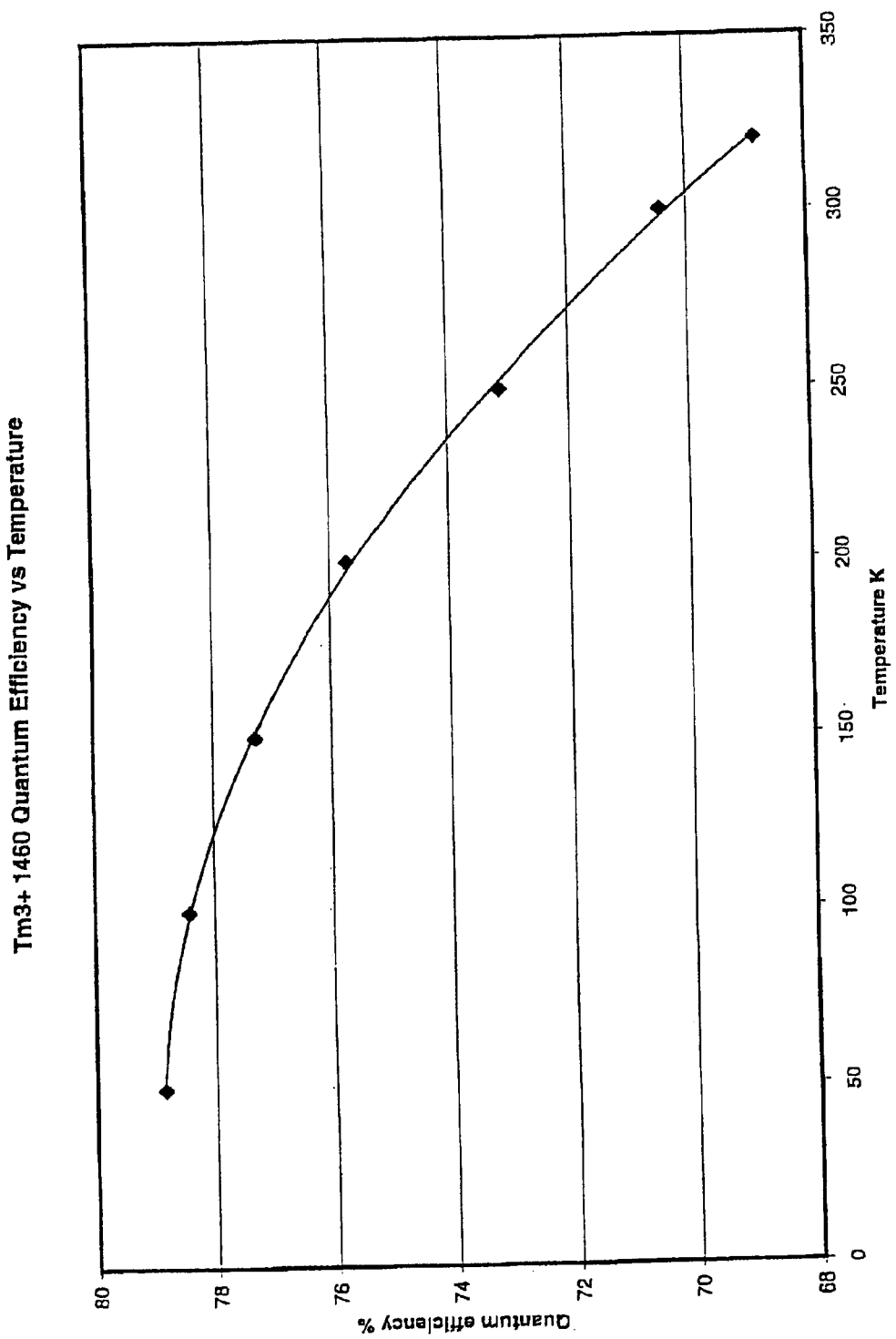
FIG. 4 illustrates the quantum efficiency of thulium ions over temperature.

Turning to FIG. 4, the increase in the $Tm^{3+}$ fluorescence lifetime of the 1460 nm transitions is illustrated as the temperature is decreased. Non-radiative decay mechanisms which reduce the radiative efficiency of rare earth (RE) ions are less probable at lower temperatures, so the quantum efficiency increases as the temperature is decreased. Thus it is advantageous to cool an amplifier for increased efficiency as well as wavelength tuning and shaping.

Figure 5:
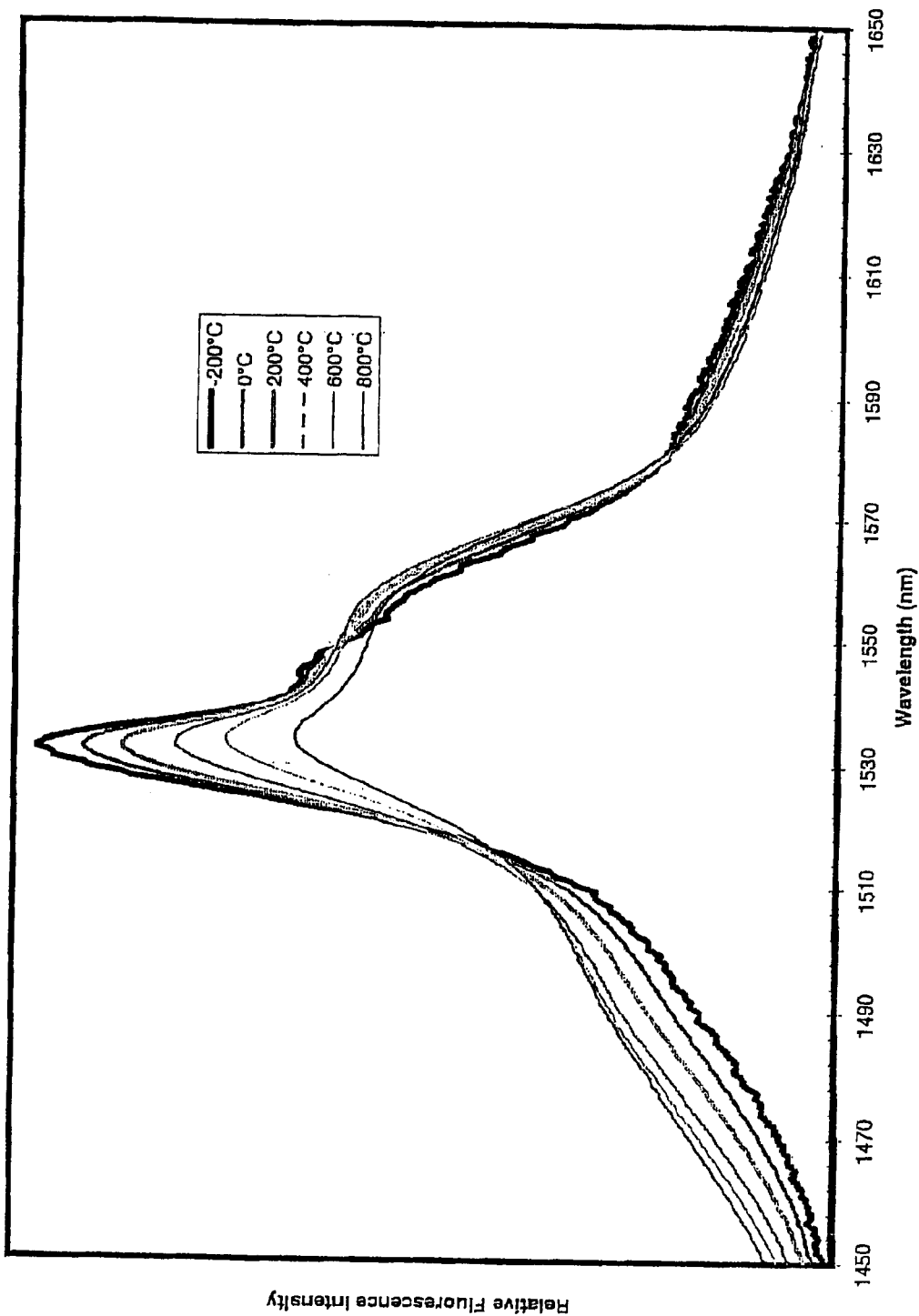
FIG. 5 illustrates the fluorescence curve for erbium which is representative of the gain curve for erbium.

These characteristics are not limited to $Tm^{3+}$. It is predicted that many, if not all, optically active ions and molecules will exhibit these same or similar thermal trends. For example, FIG. 5 shows the fluorescence spectrum of an erbium ion ($Er^{3+}$) doped fiber as a function of temperature. As the fiber is cooled from high temperature, the fluorescence red shifts toward longer wavelengths. This is advantageous for an L-band amplifier which normally would operate on the weaker erbium fluorescence in the 1580 to 1610 nm region. Cooling the erbium fiber, for example to −200 degrees C., can therefore produce approximately a 10–20% gain advantage over higher temperature fiber. In particular, the gain advantage in the region of 1600 to 1630 and especially 1610 nm to 1630 nm is particularly useful in extending the bandwidth of the erbium doped fiber amplifier (EDFA).

While cooling is advantageous in the L-band, heating is advantageous for gain flattening in the C-band. As shown in FIG. 5, as the fiber is heated to 800 degrees C., the fluorescence intensity variation in the C-band (approximately 1520 nm to 1560 nm) is diminished. However, the changes in absorption should also be taken into account since this is a 3-level system and ground state absorption will also be important in determining the gain shape.

Figure 6:
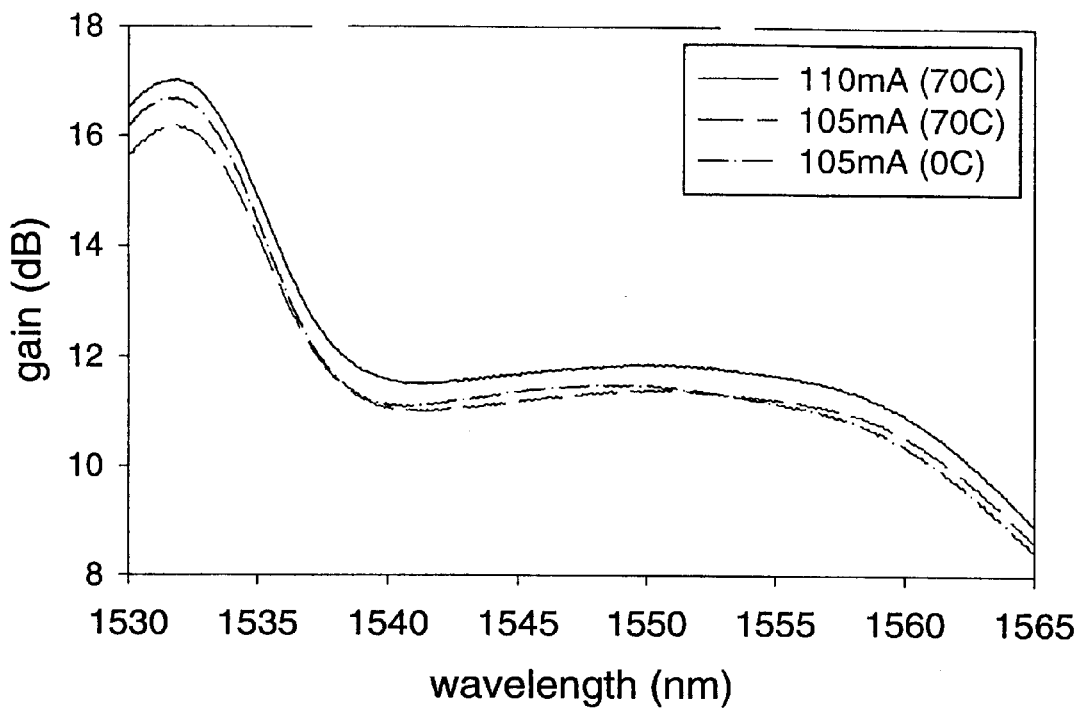
FIG. 6 is a diagram of the gain of an exemplary amplifier, at 0° C. and 70° C. and pump laser diode operating at current of 105 mA and 110 mA.
Figure 7:
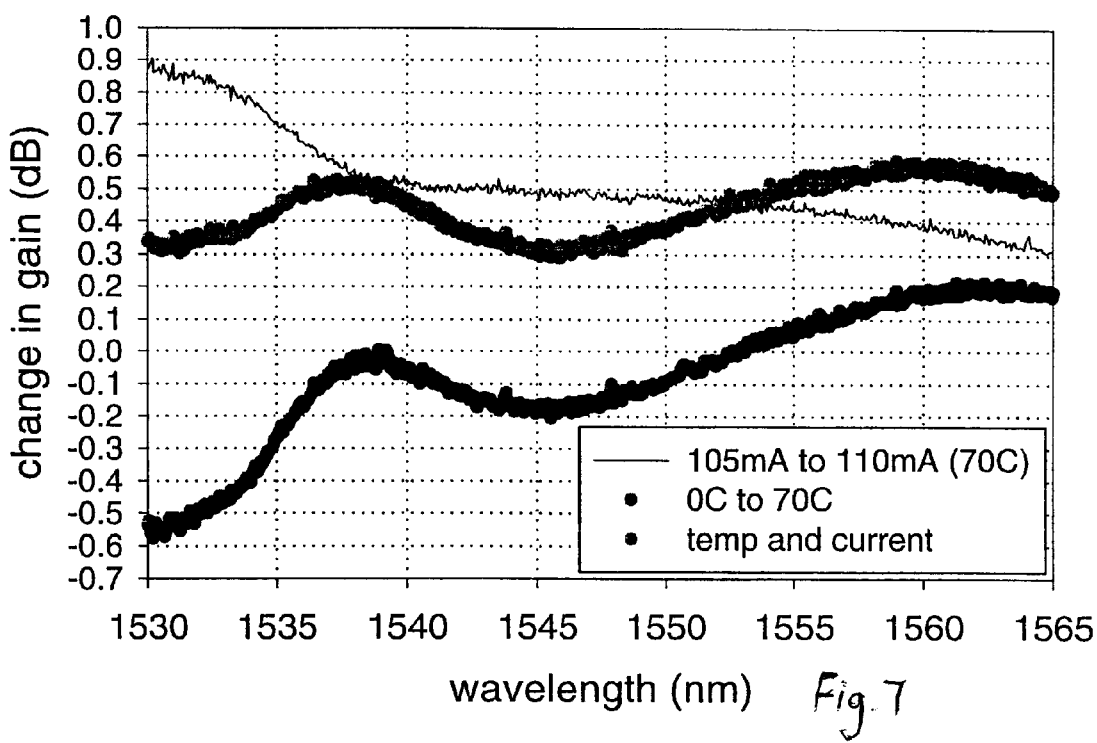
FIG. 7 is a diagram of amplifier's Gain Tilt at 0° C. and 70° C. of an exemplary amplifier with the pump laser diode operating at a current of 105 mA and 110 mA.

When signal channels entering an optical amplifier are either added or dropped, the overall inversion of the optically active ions is changed, giving rise to a change in gain as illustrated Fig 6. The absolute gain and gain tilt increase when the inversion increases and decrease when inversion decreases. To compensate for this gain tilt, when channels are added or dropped, the inversion of the amplifier must be changed by increasing or decreasing the pump power to restore the gain shape. However this can change the absolute gain of the amplifier which then must be compensated by a variable optical attenuator or VOA. VOA's are mechanical devices that intentionally waste optical power VOAs have a slow response time and add expense to the cost of the amplifier. However, the gain tilt problem can be solved by using temperature control to compensate for gain Consider an amplifier operating at 70° with 110 mA of pump power. (The gain ripple would be compensated by a filter to make the gain from 1530 to 1560 flat). The pump current is then decreased by 5% to 105 mA to simulate the adding of a channel, resulting in decreased gain and tilt (both undesirable). FIG. 6 shows that by cooling the amplifier fiber to 0° C. the gain is partially restored and the gain tilt or gain ripple is reduced. FIG. 7 shows the differences in the gain as a result of these changes. The 5% power fluctuation cause a 0.9 dB drop in the gain and 0.6 dB of ripple (variation). However by reducing the temperature, the ripple is decreased by a factor of 2 to 0.3 dB.

Figure 8:
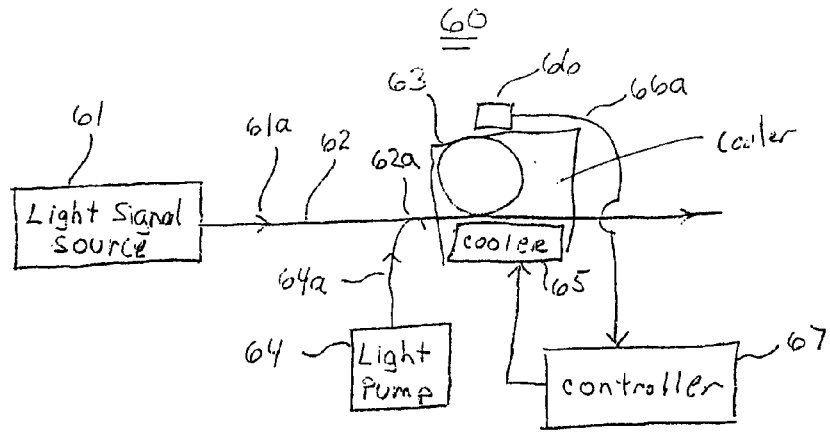
FIG. 8 is a schematic diagram of the preferred embodiment of the invention.

Referring now to FIG. 8 there is illustrated a schematic diagram of a preferred embodiment of the invention as a thulium doped fiber amplifier (TmDFA) 60. A light signal 61a is coupled into fiber 62 from light signal source 61. Signal source 61 is typically a telecommunications network or some component thereof. Light signal 61a preferably has wavelengths in the range of 1460 nm to about 1540 nm and more preferably in the range of the S-band or 1485 nm to 1525 nm.

Light signal 61a is transmitted through fiber 62 to amplifying fiber 63. The symbol indicating amplifying fiber 63 is a loop since the doped optical fibers are typically coiled due to space limitations. Amplifying fiber 63 is preferably doped with either erbium or thulium, however the invention may be practiced with most any fluorescent material including the family of rare earth elements such as: cerium (Ce), praseodymium (Pr), neodymium (Nd), promethium (Pm), samarium (Sm), europium (Eu), gadolinium (Gd), terbium (Tb), dysprosium (Dy), holmium (Ho), ytterbium (Yb).

In another aspect of the invention the amplifying fiber 63 may be a planar waveguide or, in general, any type of optical waveguide.

Pump light source 64 provides pump light 64a for exciting the erbium ions in amplifying fiber 63. Light source 64 is preferably a semiconductor laser operating at about 980 nm or 1480 nm wavelengths. However, various other sources of pump light may also be used. Pump light 64a is coupled to fiber 62 via optical coupler 62a.

Cooling of the amplifying fiber 63 is accomplished by cooling device 65, which is preferably a thermal electric (TE) cooler. Amplifying fiber 63 is wound or coiled around the TE cooler 65. In an alternate embodiment, the amplifying fiber 63 is wound around a thermally conducting material, such as aluminum, which is thermally coupled to the TE cooler 65. TE coolers are known in the art. Recent advances in TE coolers useful to the instant invention. Cooling may be accomplished by virtually any cooling means, including air cooling and liquid cooling. Another cooling option is optical or fluorescent cooling which is described in detail below.

The cooling of amplifier fiber 63 may be regulated via a temperature sensor 66 in communication with a controller 67, which regulates cooling device 65. Temperature sensor is preferably a thermocouple device that generates a temperature signal 66a indicative of the temperature of amplifying fiber 63. Controller 67 is a conventional digital control unit programmed to implement a suitable feedback control algorithm.

The desired temperature of the amplifying fiber 63 will vary depending on the requirements and specifications of a particular application. Generally the fiber 63 should be cooled below 270 degrees Kelvin. Preferably the fiber 63 is cooled to about 200 degrees Kelvin. More preferably the fiber 63 is cooled to about 150 degrees Kelvin and most preferably the fiber 63 is cooled to about 100 degrees Kelvin. It is also preferred to cool the fiber 63 to about 50 degrees Kelvin.

Light signal 61a is transmitted through amplifying fiber 63 where the signal is amplified manyfold and the amplified signal is output on output fiber 68.

Figure 9:
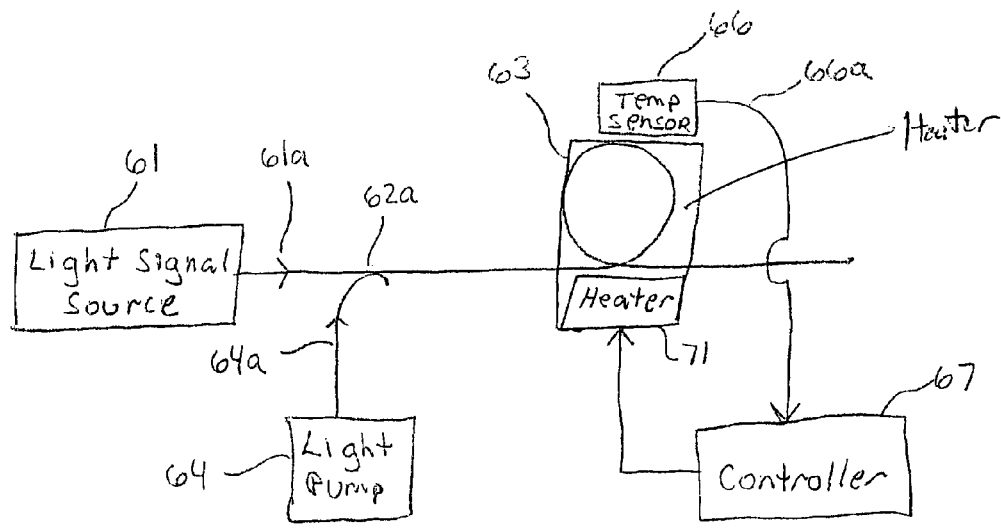
FIG. 9 is a schematic diagram of the invention heating an optical amplifier.

Another aspect of the invention is illustrated in FIG. 9 where a heating device 71 heats the amplifying fiber 63. As discussed above in relation to FIG. 5, the gain curve of an erbium-doped optical fiber will flatten as the temperature increases. The signal source 61, pump light source 64, temperature sensor 66, and controller 67 are identical to the components in FIG. 8.

Amplifying fiber 63 is preferably heated above 200 degrees C., and more preferably heated to above 400 degrees C., and still more preferably heated above 600 degrees C., and most preferably heated to about 800 degrees C. Heating device 71 is a resistive heating element but may also be any other type of heating device including air heating, radiant heating, inductive heating, or the like.

Figure 10:
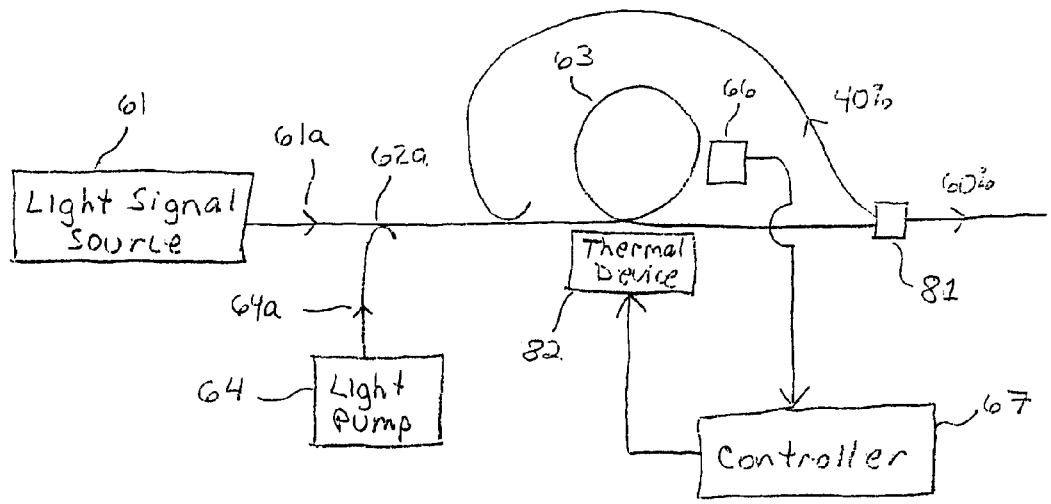
FIG. 10 is a schematic diagram of the invention embodied in a fiber optic laser.

A particularly useful application for the invention is in fiber lasers, an exemplary schematic of which is illustrated in FIG. 10. Pump light 64 injects pump light into amplifying fiber 63. A light signal 61a may also be injected by light signal source 61. The light signal is amplified by amplifying fiber 63 and output to grating 81 which allows a portion of the light to pass and reflecting a portion of the light back into amplifier fiber 63 as is commonly known. A problem with fiber lasers is that it is difficult to obtain laser light of various wavelengths.

The invention solves this problem my enabling the amplifying fiber 63 to be tuned to a desired wavelength by controlling the temperature. Using the invention, previously difficult to generate laser wavelengths are easily generated. This schematic is shown with a thermal device 82 to indicate that the amplifying fiber 63 may be either heated or cooled to achieve the desired result. In other respects the components function the same as the components in FIGS. 8 and 9.

Figure 11:
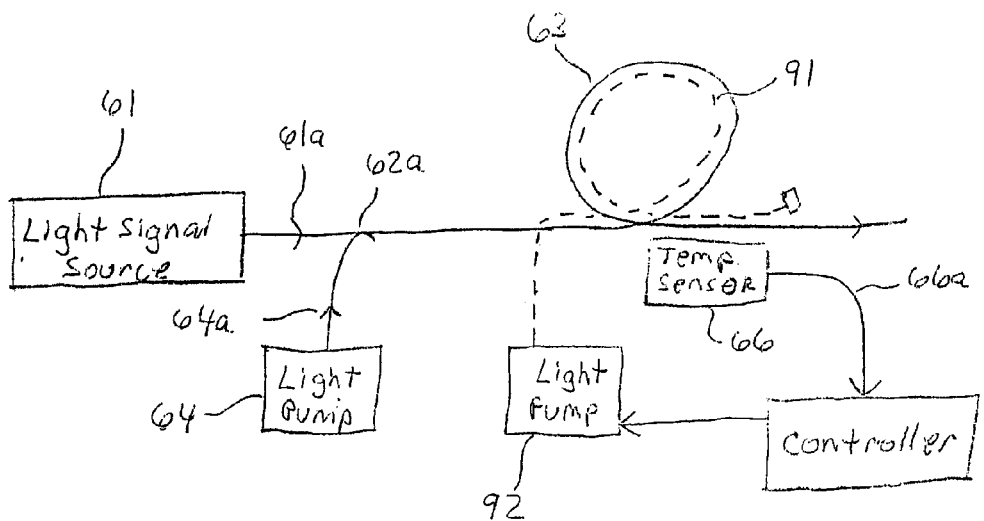
FIG. 11 is a schematic diagram of the invention comprising a co-wound optical cooling waveguide.

An innovative apparatus useful to cool an amplifying fiber or waveguide is illustrated in FIG. 11. Using the principles of optical cooling a device is constructed to cool the amplifying fiber 63. Recent advances in optical cooling make this method and apparatus viable.

To describe briefly, an optical cooling device comprises a light waveguide doped with an appropriate fluorescent refrigerant and pumped with an suitable light wavelength. The absorption of thermal energy presumably produces the cooling effect. In FIG. 11, a cooling optical fiber 91 (dashed line) is doped with such a fluorescent refrigerant and co-wound with the amplifying fiber 63. The cooling pump 92 launches pump light into cooling optical fiber 91. As fiber 91 cools the co-wound amplifying fiber is also cooled. A temperature sensor and controller may be added to control the cooling process as was done in FIG. 8.

In another aspect of the invention, the fluorescent refrigerant is doped into the same optical waveguide as the amplifying fiber 63. This is accomplished in at least two ways. First, as illustrated in FIG. 12B, the fluorescent refrigerant 101 is doped into the cladding or outer layer 103 of amplifying fiber 63. Light signals 61a are transmitted via core 102 while light is pumped through the cladding 103 causing the cladding 103 to cool. As the cladding 103 is cooled, the core 102 is also cooled.

Figure 12A:
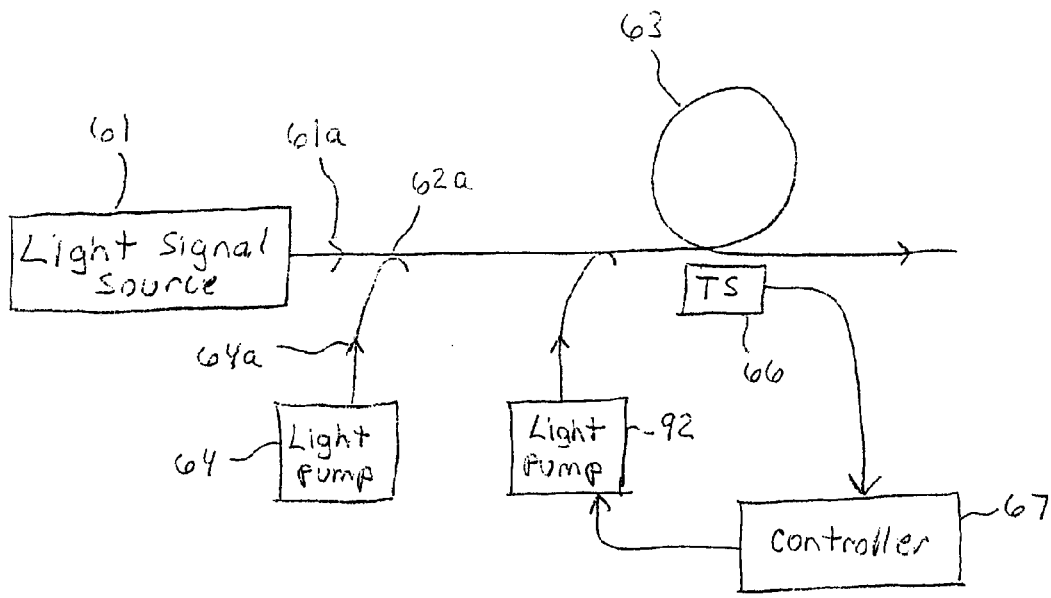
FIG. 12A is a schematic diagram of the invention comprising fluorescent refrigerant doped in the amplifying fiber.
Figure 12B:
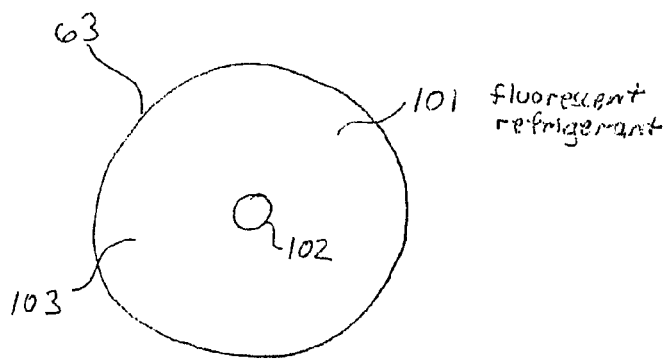
FIG. 12B is a cross section of an amplifying fiber doped with fluorescent refrigerant in the cladding.
Figure 12C:
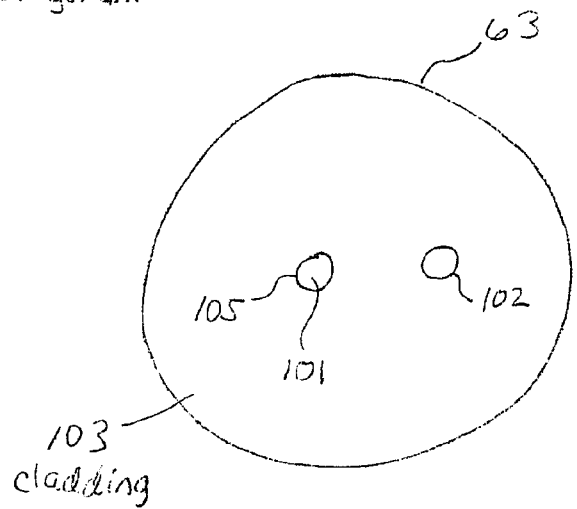
FIG. 12C is a cross section of an amplifying fiber having a second core doped with fluorescent refrigerant.

Secondly, as illustrated in FIG. 12C, the amplifying fiber 63 comprises a second core 105 doped with fluorescent refrigerant. Pump light is injected through the second core 105 causing it to cool and consequently cooling the central core 102.

FIG. 12 illustrates a schematic diagram of these two embodiments. The amplifying fiber 63 and pump light source 64 are identical to those in FIG. 8. Cooling pump 92 is added to inject pump light into either the cladding or second core of amplifying fiber 63 via optical coupling 62b.

The method of the invention follows from the description of the apparatus. A light waveguide is provided that is doped with a fluorescent material suitable for being excited by pump light and amplifying a light signal. A pump light source is provided and optically coupled to the light waveguide providing a suitable pump light to excite the fluorescent material. A thermal device, such as a heating device, a cooling device, or optical cooler is thermally coupled to the light waveguide. Finally, a temperature sensor senses the temperature of the waveguide and communicates a temperature signal to a controller, which in turn controls the thermal device to achieve a desired waveguide temperature.

It will become apparent to those skilled in the art that various modifications to the preferred embodiment of the invention as described herein can be made without departing from the spirit or scope of the invention as defined by the appended claims.

The invention claimed is:

1. A thermally tuned optical amplifier comprising:
a length of thulium doped light waveguide comprising a first end for receiving a light signal and a second end for outputting an unsaturated amplified light signal;
a pump light source optically coupled to said waveguide and generating light to excite said thulium;
a cooling device thermally coupled to said waveguide, said cooling device cooling at least a part of said waveguide to a temperature of less than about 250 degrees Kelvin; and
wherein said light signal has a wavelength in the range of between 1450 nm and 1550 nm.

2. The thermally tuned optical amplifier of claim 1 wherein said cooling device cools said waveguide to a temperature of less than about 150 degrees Kelvin.

3. The thermally tuned optical amplifier of claim 2 wherein said cooling device cools said waveguide to a temperature of less than about 100 degrees Kelvin.

4. The thermally tuned optical amplifier of claim 1 wherein said light waveguide is a length of thulium doped optical fiber.

5. The thermally tuned optical amplifier of claim 1 wherein said waveguide is a planar waveguide.

6. The thermally tuned optical amplifier of claim 1 wherein said cooling device is an optical cooling device.

7. The thermally tuned optical amplifier of claim 6,
wherein said waveguide comprises an amplifier central core; and
wherein said cooling device comprises,
an outer core surrounding said central core, said outer core doped with a fluorescent refrigerant, and
a pump light source optically coupled to said outer core.

8. The thermally tuned light signal amplifier of claim 7 wherein said fluorescent refrigerant produces pump light which is optically coupled to the central core.

9. The thermally tuned light signal amplifier of claim 7 wherein said fluorescent refrigerant comprises ytterbium (Yb).

10. The thermally tuned light signal amplifier of claim 9 wherein said ytterbium fluorescent refrigerant produces pump light which is optically coupled to the thulium doped central core.

11. The thermally tuned light signal amplifier of claim 6 wherein said cooling device comprises,
a length of optical waveguide doped with a fluorescent refrigerant,
a pump light source optically coupled to said optical waveguide, and
wherein said cooling device is positioned proximate to said light waveguide.

12. The thermally tuned light signal amplifier of claim 6 wherein said light waveguide comprises a first core inside of a cladding, and
said cooling device comprises,
a second core doped with fluorescent refrigerant, said first and second cores inside the same cladding such that the second core is sufficiently near to said first core to thermally cool said first core, and
a pump light source optically coupled to said second core.

13. A thermally tuned optical amplifier comprising:
a length of light waveguide doped with a fluorescent material, said light waveguide comprising a first end for receiving a light signal and a second end for outputting an amplified light signal;
a heating device thermally coupled to said waveguide, said heating device heating said waveguide to a temperature of more than about 300 degrees Centigrade; and
wherein said light signal has a wavelength in the range of between 1500 nm and 1640 nm.

14. The thermally tuned optical amplifier of claim 13 wherein said waveguide is heated to a temperature of more than about 500 degrees Centigrade.

15. The thermally tuned optical amplifier of claim 14 wherein said waveguide is heated to a temperature of more than about 600 degrees Centigrade.

16. The thermally tuned optical amplifier of claim 15 wherein said waveguide is heated to a temperature of more than about 700 degrees Centigrade.

17. The thermally tuned optical amplifier of claim 13 wherein said waveguide is heated to a temperature of more than about 800 degrees Centigrade.

18. The thermally tuned optical amplifier of claim 13 wherein said light waveguide is doped with erbium (Er).

19. A doped optical amplifier comprising:
a length of homogeneously broadened rare earth doped light waveguide comprising a first end for receiving a light signal and a second end for outputting an unsaturated amplified light signal, said waveguide doped with a material excitable by pump light;

a pump light source; and a thermal device in communication with said waveguide such that the temperature of said waveguide is controlled to shape the unsaturated gain characteristic of the doped light waveguide at a desired wavelength band, wherein the temperature of said waveguide is cooled to less than about 270 degrees Kelvin.

20. The doped optical amplifier of claim 19, wherein said material excitable by pump light comprises an element selected from the group consisting of erbium (Er), thulium (Tm), cerium (Ce), praseodymium (Pr), neodymium (Nd), promethium (Pm), samarium (Sm), europium (Eu), gadolinium (Gd), terbium (Tb), dysprosium (Dy), holmium (Ho), and ytterbium (Yb).

21. The doped fiber amplifier of claim 19, wherein said thermal device is selected from the group consisting of optical coolers, thermoelectric devices, air cooling devices, and liquid cooling devices, resistive heaters, inductive heaters, air heaters, and radiant heaters.

22. The doped optical amplifier of claim 19, further comprising a temperature controller coupled to said thermal device, said controller controlling the temperature of said thermal device.

23. The doped optical amplifier of claim 22, further comprising:
a temperature sensor suitable for generating a temperature signal indicative of the temperature of said waveguide; and
wherein said temperature controller controls said thermal device as a function of said temperature signal.

24. The doped optical amplifier of claim 19, wherein the temperature of said waveguide is cooled to less than about 200 degrees Kelvin.

25. The doped optical amplifier of claim 24, wherein the temperature of said waveguide is cooled to less than about 150 degrees Kelvin.

26. The doped optical amplifier of claim 19, wherein:
the waveguide is doped with erbium;
the waveguide is cooled to less than about 200 degrees Kelvin; and
the light signal is in the range of between 1550 nm to 1640 nm.

27. The optical amplifier according to claim 26, wherein said light signal is in the range between 1590 nm and 1640 nm.

28. The doped optical amplifier of claim 26, wherein the light signal is in the range of between 1600 nm to 1630 nm.

29. The doped optical amplifier of claim 19, wherein the waveguide is doped with thulium and the light signal is in the range of between 1500 nm and 1550 nm.

30. A doped optical amplifier comprising:
a length of rare earth doped light waveguide comprising a first end for receiving a light signal and a second end for outputting an amplified light signal, said fiber doped with a material excitable by pump light;
a pump light source; and
a thermal device in communication with said waveguide such that the temperature of said waveguide is controlled to shape the gain characteristic of the doped light waveguide at a desired wavelength band, wherein the temperature of said waveguide is heated to above 200 degrees Celsius.

31. The doped optical amplifier of claim 30, wherein the temperature of said waveguide is heated to above 300 degrees Celsius.

32. The doped optical amplifier of claim 30, wherein the temperature of said waveguide is heated to above 500 degrees Celsius.

33. The doped optical amplifier of claim 30, wherein the temperature of said waveguide is heated to above 700 degrees Celsius.

34. A method of amplifying a light signal comprising the steps of:
providing a light waveguide doped with a homogeneously broadened material compatible with amplifying a light signal, said waveguide comprising a first end for receiving said light signal and a second end for outputting an unsaturated amplified light signal;
providing a pump light source;
optically coupling the light source to said waveguide;
providing a cooling device;
thermally coupling said cooling device to said waveguide; and
tuning said waveguide to a desired gain shape by controlling said cooling device to cool said waveguide to below 270 degrees Kelvin.

35. The method of claim 34, wherein said waveguide is cooled to below 200 degrees Kelvin.

36. The method of claim 34, wherein said light waveguide is doped with a fluorescent material.

37. The method of claim 34, wherein said light waveguide is doped with a material comprising an element selected from the group consisting of erbium (Er), thulium (Tm), cerium (Ce), praseodymium (Pr), neodymium (Nd), promethium (Pm), samarium (Sm), europium (Eu), gadolinium (Gd), terbium (Tb), dysprosium (Dy), holmium (Ho), ytterbium (Yb).

38. The method of claim 34, wherein said cooling device is selected from the group of cooling devices consisting of optical cooling devices, thermoelectric cooling devices, air cooling devices and liquid cooling devices.

39. A method of tuning a light signal amplifier comprising the steps of:
providing a light waveguide doped with a material compatible with amplifying a light signal, said waveguide comprising a first end for receiving said light signal and a second end for outputting an amplified light signal;
providing a pump light source suitable for exciting said material;
optically coupling the light source to said waveguide;
providing a heating device;
thermally coupling said heating device to said waveguide; and
tuning said waveguide to a desired gain shape by controlling said heating device to heat said waveguide to above 200 degrees Celsius.

40. The method of tuning of claim 36, wherein said material is selected from the group consisting of erbium (Er), thulium (Tm), cerium (Ce), praseodymium (Pr), neodymium (Nd), promethium (Pm), samarium (Sm), europium (Eu), gadolinium (Gd), terbium (Tb), dysprosium (Dy), holmium (Ho), ytterbium (Yb).

41. The method of tuning of claim 40 wherein the waveguide is heated to above 400 degrees Celsius.

42. A thermally cooled light waveguide comprising:
a length of light waveguide comprising a homogeneously broadened material, a first end for receiving a light signal and a second end for outputting an unsaturated light signal;
a light source optically coupled to said waveguide and generating said light signal; and
an optical cooling device thermally coupled to said waveguide, said cooling device cooling said waveguide.

43. The thermally cooled light waveguide of claim 42, wherein said waveguide comprises a central core; and wherein said cooling device comprises,
 an outer core surrounding said central core, said outer core doped with a fluorescent refrigerant, and
 a pump light source optically coupled to said outer core.

44. The thermally cooled light waveguide of claim 43 wherein said fluorescent refrigerant produces pump light which is optically coupled to the central core.

45. The thermally cooled light waveguide of claim 43 wherein said fluorescent refrigerant comprises ytterbium (Yb).

46. The thermally cooled light waveguide of claim 45 wherein said ytterbium fluorescent refrigerant produces pump light which is optically coupled to the central core.

47. The thermally cooled light waveguide of claim 42 wherein said cooling device comprises,
 a length of optical waveguide doped with a fluorescent refrigerant,
 a pump light source optically coupled to said optical waveguide, and
 wherein said cooling device is positioned proximate to said light waveguide.

48. The thermally cooled light waveguide of claim 42, wherein said light waveguide comprises a first core inside of a cladding, and
 said cooling device comprises,
 a second core doped with fluorescent refrigerant, said first and second cores inside the same cladding such that the second core is sufficiently near to said first core to thermally cool said first core, and
 a pump light source optically coupled to said second core.

49. A doped optical amplifier according to claim 19, wherein said amplifier is characterized by gain tilt and said temperature of said waveguide is changed by said thermal device to compensate for said gain tilt.

50. A doped optical amplifier according to claim 19, wherein said amplifier is characterized by gain tilt caused by a change in a number of channels provided to said amplifier and, wherein said temperature of said waveguide is adjusted by said thermal device to compensate for said gain tilt.

* * * * *